Sept. 12, 1950         C. M. TUTTLE                    2,521,953
            METHOD AND APPARATUS FOR INSPECTING
                   LIGHT-SENSITIVE COATINGS
                    Filed Oct. 19, 1946
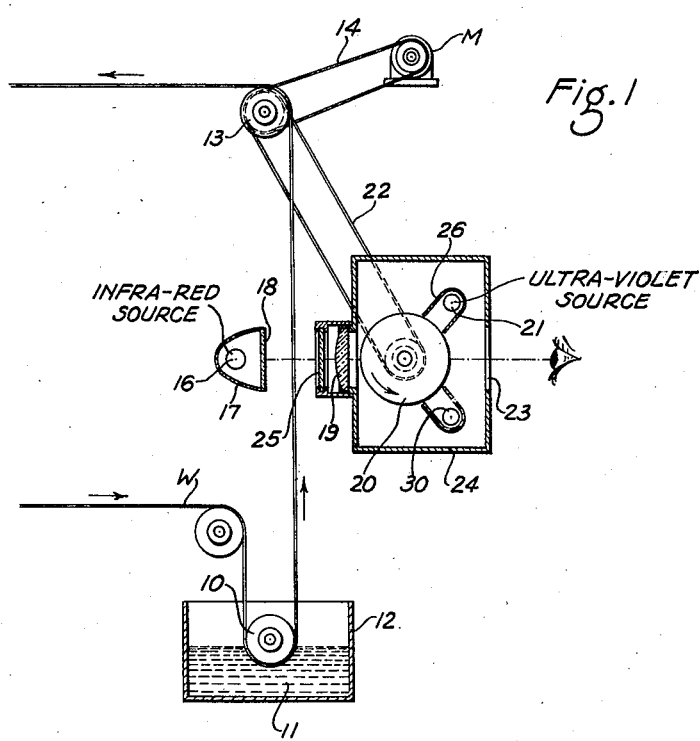
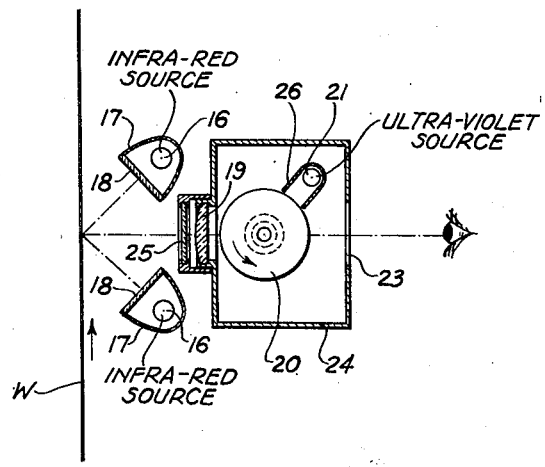
Clifton M. Tuttle
INVENTOR Patented Sept. 12, 1950

2,521,953

UNITED STATES PATENT OFFICE 2,521,953

METHOD AND APPARATUS FOR INSPECTING LIGHT-SENSITIVE COATINGS

Clifton M. Tuttle, Huntington Station, N. Y., assignor to Eastman Kodak Company, Rochester, N. Y., a corporation of New Jersey Application October 19, 1946, Serial No. 704,507

12 Claims. (Cl. 250—65)

The present invention relates to photography and particularly to a method and apparatus for inspecting light-sensitive materials.

As is well known, panchromatic photographic materials cannot be exposed during manufacture to a sufficient quantity of light to allow adequate visual inspection of the light-sensitive coating to determine the uniformity thereof.

It is common practice to inspect the uniformity of such coatings with the aid of infrared either by measurement of transmission or reflection by photoelectric means or its equivalent, or by means of a continuous recording by infrared photography. These known procedures, however, have certain limitations in common which make them undesirable and/or impractical. First, considerable delicate, expensive and bulky equipment is involved in the application of either procedure. Secondly, the infrared region to which both photoelectric cells and photographic materials are sensitive lies dangerously near the wave length region that effects the material being inspected. Third, certain antihalation backings, e. g. "Rem-jet," which are placed on films being themselves highly absorbent in the photoelectric and photographic infrared regions affect transmission readings to such a considerable extent that non-uniformity in the backing masks the measurement of emulsion non-uniformity. And, fourth, the photographic method has a further limitation in that there is a long delay involved due to processing before the results of inspection are available.

The primary object of the present invention is to provide a method and apparatus for inspecting the uniformity of light-sensitive emulsion coatings on photographic films which overcomes all of the disadvantages noted above possessed by known procedures.

The specific objects of the present invention include a procedure for inspecting the uniformity of light-sensitive coatings on film which uses infrared radiations of considerably longer wave length than useful in the prior art receivers, so that all chance of fogging the film is eliminated and the normal antihalation backings used on film have no appreciable absorption effect on the infrared; a visual image of the coating is available instantaneously, or almost so, so that the procedure is adaptable to coating control; and the procedure is adapted for continuous scanning of a moving film strip of any width so that it can be used in conjunction with the emulsion-coating apparatus and substantially at the coating station thereof.

The novel features that I consider characteristic of my invention are set forth with particularity in the appended claims. The invention itself, however, both as to its organization and its methods of operation, together with additional objects and advantages thereof, will best be understood from the following description when read in conjunction with the accompanying drawings in which Fig. 1 is a schematic side view of a preferred embodiment of an apparatus for carrying out the present invention, and Fig. 2 is a view similar to a portion of Fig. 1 and showing another modification of the apparatus suitable for practising the method according to the present invention.

Like reference numerals refer to corresponding parts throughout the drawings.

Briefly, according to the present invention, the coated photographic film is scanned with infrared light of a wave length to which the light-sensitive coating is insensitive and which is absorbed to a small extent by antihalation backing materials, but is strongly absorbed by most emulsion coatings. This forms an infrared image of the coating which is then directed onto a surface coated with an infrared sensitive phosphor which has previously been excited with a suitable exciting source, such as ultraviolet light or other source of phosphorocigenous radiation. The infrared image of the film quenches the excited phosphor surface and leaves an image on the surface which can be viewed directly. If the phosphor used is one of the many highly-quenchable phosphors available, then a negative image of the coating on the film will appear on the phosphor surface. If the phosphor used is of the type which has little afterglow after excitation and remains stimulable, then the excited phosphor surface, after the afterglow has died completely, or somewhat, may be stimulated with the infrared image of the film and if observed immediately, a positive image of the film will appear in the phosphor surface.

Another way of using a stimulable phosphor is to excite the same and after letting the afterglow die down somewhat, exhaust the same by directing the infrared image of the film thereon. A negative image will appear at this time which is flat (not contrasty) because the afterglow is low. Then at the point of observation the phosphor surface is stimulated with a uniform flash of infrared radiation to bring out the rest of the background (that not exhausted by infrared image of film) and a contrasty negative image of the film will be observed on the phosphor surface.

Referring now to the drawings. I have shown an apparatus for continuously inspecting a film immediately after the coating operation so that the observation can be used to check the operation of the coating machine, but it will be understood that the present invention is just as well adapted for the measurement of an emulsion coating on a single sheet of film at any time.

In Fig. 1 I have shown a web of film base W, which may or may not have an antihalation backing layer thereon, passed over an immersion roller 10 in a bath of light-sensitive emulsion 11 in a supply tank 12 whereby the film base is coated by the well-known immersion technique. Subsequent to coating, the film is moved vertically by passing over a driven roll 13 from which it proceeds through the usual steps of setting and drying prior to being wound up. The driven roller 13 may be driven by a belt 14, or other drive means, from a motor M. The film may be 40 to 50 inches wide, as is customary in the film manufacturing art.

To one side of the vertical reach of the coated film is situated a source of infrared radiation of considerably longer wave length than heretofore used for such a purpose, and of a wave length which is absorbed only in small degree by the antihalation backing, but it is strongly absorbed by most emulsion coatings. This infrared radiator may comprise a long calrod heater rod 16 at the focus of an elliptical reflector 17 and in front of which there is situated a #87 filter 18. If the calrod heater rod has a temperature lower than 1800° K., then ninety percent of the radiation reaching the film will have a wave length longer than $1.2\mu$. Radiation in this wave length region is absorbed only in small degree by any antihalation backing on the film, but is strongly absorbed by most emulsion coatings.

Radiant energy passing through the film is focused by a cylindrical lens strip 19 onto the surface of the drum 20. The surface of this roller is coated with a suitable infrared sensitive phosphor material, which may be any one of the many different types of phosphors which, after being excited by a source of phosphorocigenous radiation, may be quenched or stimulated by infrared radiation. The phosphor surface of the drum 20 is excited by a source of phosphorocigenous radiation 21, which may be a source of ultraviolet, X-ray, radio-active substances, etc., depending upon what type of phosphor is used on the drum. The drum 20 is rotated counterclockwise to move the surface of the drum past the lens 19, or exposure position, after excitation, and the speed of the drum corresponds to that of the film so that successive areas of the film are imaged on successive areas of the drum surface. This desired speed relation of the drum and film can be readily obtained by driving the drum from the film feed, as by belt 22 passing over a pulley associated with the drum and a pulley associated with the driven roller 13.

The thinner portions of the emulsion coating on the film—streaks, digs, skips, and the like—transmit more infrared to the phosphor and cause an increase in quenching or stimulation, depending upon what type of phosphor is used, and a pattern or image of the film coating thus becomes visible to an observer who looks into the viewing station 23 of the shielding box 24 of the apparatus. Between the luminous drum surface and the film is a light-absorbing filter 25, such as #87, that protects the sensitive coating from the light emitted by the excited phosphor surface of the drum. In addition, the source of phosphorocigenous radiation 21 is covered by a shield 26 which confines its radiation to a limited area of the drum and prevents stray rays therefrom from getting to the sensitive coating on the film and/or from striking and exciting the portion of the surface quenched and/or stimulated by an infrared image of the film before it reaches the observation point and acting to erase the image of the film from the drum surface.

The present invention is not limited to inspection of the film by transmitted infrared radiation, but is equally adapted to the use of reflected infrared radiation, as well. In Fig. 2 I have shown the modification necessary in the apparatus for inspection by reflection. All of the parts required are the same as those used in the preferred embodiment and are designated by the same reference characters. The only change involves moving the source of infrared radiation 16 to the same side of the film as the phosphor-coated drum so that the radiations therefrom will act to "illuminate" the surface of the sensitive coating. While only one source of infrared radiation is really needed, I have shown two sources, located on opposite sides of the phosphor-coated drum 20, to obtain a more uniform "illumination" of the coating surface. The image of the coating surface is then impressed on the phosphor surface of the drum in much the same manner as an illuminated subject is photographed on a light-sensitive film.

Although the present invention is limited to the use of infrared sensitive phosphors, there are many types of these which have different light-emitting characteristics which affect the results obtained by the present invention and which might be explained herein although the phosphors themselves are not my invention, nor do they form part of the present invention except in the manner used.

Ordinary phosphors emit visible light when excited by ultraviolet light (or X-rays, radioactive substances, or the like). These exciting sources have been referred to by me as sources of phosphorocigenous radiations for the lack of a better generic term. Light emitted during excitation, or within a few milliseconds thereafter, is referred to as fluorescence while that emitted after excitation has been terminated is referred to as phosphorescence. Infrared phosphors are of two types. First, those which preferably have little spontaneous phosphorescence called afterglow or background, but which have their emission enhanced by infrared radiation. This phenomenon is called stimulation. It appears as a flare-up, often not of the same color as the afterglow of the excited phosphor.

In the second type of infrared sensitive phosphors, the afterglow is diminished in brightness without any appreciable enhancement of the emission when exposed to infrared radiation. This latter phenomenon is called quenching. The net result of either quenching or stimulation, or both, is extinction of the phosphorescence. The ratio of the stimulated brightness to the intensity of the stimulating radiation is called the stimulability of the phosphor. The decrease in stimulability on continued exposure is called exhaustion and may or may not be accompanied by extinction of the afterglow.

If a highly-quenchable phosphor of the second type above mentioned is used on the surface of drum 20, then after excitation the surface will possess a rather bright afterglow of considerable duration which will be quenched with the infrared image of the film. The observer will then see a negative image of the film coating in the afterglow when the exposed areas of the drum reach the point of observation. This image will be erased when the drum surface again passes the exciting source and is reexcited. Infrared sensitive phosphors of the highly-quenchable type are well known and great in number. The cadmium sulfide type is a representative example of such a phosphor which can be readily excited by ultraviolet light. Further examples of highly-quenchable phosphors can be obtained from text books on the subject, e. g. Handbuch der Experimental Physik XXIII by P. Lenard. This is the type of phosphor for which the disclosed apparatus is particularly adapted since the observation point is remote from the exposure position.

Let us consider now a phosphor of the first type mentioned which has a high stimulability and weak afterglow. If such a phophor is used on the drum 20, then, by the time it reaches the exposure position, the afterglow caused by excitation will have died somewhat, or completely, and the phosphor will then be exhausted by stimulation by the infrared image of the film. A negative image of the film will appear in the phosphor but this image may appear flat (not contrasty), if the afterglow in the phosphor is low. The negative image may be made contrasty if the phosphor surface is stimulated with a uniform flash of infrared radiation subsequent to exposure and prior to observation, said uniform stimulation acting to bring out the rest of the background. This uniform stimulation may be effected by a shielded source of infrared radiation, shown at 30 in Fig. 1. The source 30 can be provided with a manual switch, not shown, so that it can be selectively turned on and off depending upon the type of phosphor used on the drum surface.

A positive image of the film may be observed on the surface of the drum if one of the highly-stimulable phosphors is used. To accomplish this, the afterglow of the phosphor, after excitation, is allowed to die down somewhat. Then the same is stimulated with the infrared image of the film and observed at the same time. This technique is not particularly practical, however, since it is inconvenient to observe the surface at the same instant of exposure and such stimulated image has an existence of short duration which makes it difficult to analyze the same.

Representative examples of phosphors which have high infrared sensitivity and have preferred weak afterglow and high light storage, and are suitable for use in the present invention, are the double or multiple activator phosphors whose composition and method of manufacture are disclosed in U. S. patent application S. N. 667,013, filed May 3, 1946, in the name of Franz Urbach. Some of these phosphors are an infrared sensitive, cerium-samarium activated, strontium sulfide phosphor; strontium sulfide-sulfate activated by manganese and samarium and strontium sulfide activated by samarium-europium. It is pointed out, however, that the present invention is not limited to the use of the particular type of multiple activator phosphors referred to, but is adapted to the use of other phosphors having not so short an afterglow and high light storage, and as mentioned in the above-noted Lenard publication.

Having thus described my invention, it is believed that those skilled in the art will readily appreciate the advantages offered thereby, over previously-used methods, in inspecting the uniformity of a light-sensitive coating on a film. While it is particularly adapted to the continuous inspection of a moving film immediately after coating, and can be used as a control in connection with the coating operation, it is equally applicable to the inspection of single areas of film at any time subsequent to coating. Also, the apparatus can be used to periodically inspect given areas of the moving film at regular intervals, rather than continuously. These procedures could be likened to taking snapshots with an ordinary camera as compared with taking moving pictures with a moving picture camera.

Although I have shown and described certain specific embodiments of my invention, I am fully aware that many modifications thereof are possible. My invention, therefore, is not to be restricted to the precise details of construction and steps shown and described, but is intended to cover all modifications coming within the scope of the appended claims.

Having thus described my invention what I claim is new and desire to secure by Letters Patent of the United States is:

1. The method of determining the uniformity in thickness of a light-sensitive coating applied to a photographic film, comprising the steps of momentarily exciting an infrared sensitive phosphor surface by phosphorocigenous radiations. illuminating an area of the coating with infrared light having a wave length to which the coating is insensitive and which is readily absorbed by the coating, imaging the area of coating so illuminated onto said excited phosphor surface; and observing on said phosphor surface an image of the area of coating which will vary in intensity in accordance with variations in the uniformity of said light-sensitive coating.

2. The method of determining the uniformity in thickness of a light-sensitive coating applied to a photographic film, comprising the steps of momentarily exciting an infrared sensitive phosphor surface by phosphorocigenous radiations, transmitting through an area of the coating infrared light having a wave length to which said coating is insensitive and is readily absorbed by the coating, and directing the transmitted light onto said excited infrared sensitive phosphor surface; and observing on said phosphor surface an image of the area of coating which will vary in intensity in accordance with variations in the uniformity of said light-sensitive coating.

3. The method of determining the uniformity in thickness of a light-sensitive coating applied to a photographic film, comprising the steps of continuously moving a coated film past a source of infrared light having a wave length to which the coating is insensitive; directing the light passing through said coating onto a portion of the surface of a drum coated with an infrared sensitive phosphor which is rotating in accordance with the speed of movement of the film, exciting said phosphor by phosphorocigenous radiation immediately prior to having the infrared light directed thereon; and observing on said phosphor surface an image of the coating which will vary in intensity in accordance with variations in the uniformity of said light-sensitive coating.

4. The method of determining the uniformity in thickness of a light-sensitive coating applied to a photographic film according to claim 3, and in which the phosphor used is of the type which has a bright afterglow of some duration after being excited which is highly quenchable by the infrared image of the coating, whereby a negative image of the coating appears in the phosphor.

5. The method of determining the uniformity in thickness of a light-sensitive coating according to claim 3, in which the phosphor used is of the type which has high infrared stimulability and weak afterglow after being excited.

6. The method of determining the uniformity in thickness of a light-sensitive coating according to claim 3, in which the phosphor used is of the type which has high infrared stimulability and weak afterglow after being excited, whereby a negative image of the coating of low contrast appears on the phosphor surface; and including the step of further stimulating the infrared exposed phosphor with a uniform flash of infrared light to bring out the remainder of the background to make the negative image on the phosphor more contrasty.

7. The method of determining the uniformity in thickness of a light-sensitive coating applied to a photographic film according to claim 3, and in which the phosphor used has the characteristic of a short afterglow after being excited, exhausting the excited phosphor by stimulation with the infrared image of the coating, whereupon a negative image of the coating will appear in the phosphor surface which is lacking in contrast because the afterglow of the phosphor is low, and then stimulating the phosphor with a uniform flash of infrared light to bring out the remainder of the background, making a contrasty negative image of the coating on the phosphor surface.

8. The method of determining the uniformity in thickness of a light-sensitive coating applied to a photographic film according to claim 3, and in which the phosphor used has the characteristic of a short afterglow, and in which the excited phosphor, after the afterglow has died somewhat or completely, is stimulated with the infrared image of the coating and observed at same time whereby a positive image of the coating is observed in the phosphor surface.

9. The method of determining the uniformity in thickness of a light-sensitive coating according to claim 1, characterized by the fact that the light-sensitive coating has an antihalation coating in conjunction therewith and in which the infrared light for illuminating the coating has a wave length longer than $1.2\mu$ so as to be absorbed very little by the antihalation coating, but strongly absorbed by the light-sensitive coating.

10. Apparatus for continuously determining the uniformity in thickness of a light-sensitive coating applied to a photographic coating comprising in combination a source of infrared light having a wave length to which the coating is insensitive; means for continuously moving the coated film past the infrared light to be illuminated thereby; a continuous surface coated with an infrared sensitive phosphor; means for imaging an area of said infrared illuminated coating on a portion of said phosphor-coated surface, means for moving said phosphor-coated surface past said exposure position at a speed in accordance with that of the film; means for continuously exciting said phosphor surface with phosphorocigenous radiations immediately prior to exposure to said infrared image of the coating and in a direction opposite to that of film movement; and means for viewing the image of the coating formed on said phosphor surface after exposure to said infrared image of the coating.

11. Apparatus according to claim 10 including means for shielding the coating from rays from the phosphor surface and its exciting source and means for shielding that portion of the phosphor-coated surface between the exposure position and the viewing point from rays of the exciting source.

12. The method of determining the uniformity in thickness of a light-sensitive coating applied to a photographic coating, comprising continuously moving the film past an infrared source having a wave length to which the coating is insensitive and which is readily absorbed by the coating to have successive portions of the coating illuminated thereby; imaging the coating so illuminated onto an endless phosphor surface; continuously moving said phosphor surface past the imaged infrared rays emanating from said coating; continuously exciting each portion of said phosphor surface by phosphorocigenous radiation in advance of its exposure to the imaged infrared rays; and observing on said phosphor surface after its exposure and prior to its excitation an image of the coating which will vary in intensity in accordance with variations in the uniformity of said light-sensitive coating.

CLIFTON M. TUTTLE.

REFERENCES CITED

The following references are of record in the file of this patent:

UNITED STATES PATENTS

| Number | Name | Date |
|---|---|---|
| 1,565,256 | Christensen | Dec. 15, 1925 |
| 1,605,395 | De Ybarrondo | Nov. 2, 1926 |
| 1,648,058 | Parker | Nov. 8, 1927 |
| 1,724,572 | Geisen | Aug. 13, 1929 |
| 2,074,226 | Kunz et al. | Mar. 16, 1937 |

FOREIGN PATENTS

| Number | Country | Date |
|---|---|---|
| 509,308 | Great Britain | July 11, 1939 |